United States Patent
Saito et al.

(10) Patent No.: US 6,881,512 B2
(45) Date of Patent: Apr. 19, 2005

(54) SEPARATOR FOR FUEL CELL, PROCESS FOR PRODUCTION THEREOF, AND SOLID POLYMER TYPE FUEL CELL USING SAID SEPARATOR

(75) Inventors: Kazuo Saito, Tokyo (JP); Atsushi Hagiwara, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 361 days.

(21) Appl. No.: 10/013,545

(22) Filed: Dec. 13, 2001

(65) Prior Publication Data

US 2002/0068210 A1 Jun. 6, 2002

Related U.S. Application Data

(63) Continuation of application No. 09/464,192, filed on Dec. 16, 1999, now abandoned.

(30) Foreign Application Priority Data

Dec. 17, 1998 (JP) ............................................ 10-358797

(51) Int. Cl.[7] ................................................ H01M 8/02
(52) U.S. Cl. .............................. 429/34; 429/35; 429/36; 264/29.4; 423/447.1

(58) Field of Search .......................... 429/34–36, 231.8; 264/29.4, 29.5, 29.6; 423/447.1, 447.2, 447.4, 447.8, 448; 428/280, 281, 408, 902

(56) References Cited

U.S. PATENT DOCUMENTS

| | | | |
|---|---|---|---|
| 5,726,105 A | * | 3/1998 | Grasso et al. ................ 429/326 |
| 5,942,347 A | * | 8/1999 | Koncar et al. ................. 429/30 |
| 2001/0055710 A1 | * | 12/2001 | Saito et al. .................... 429/34 |

OTHER PUBLICATIONS

U.S. Standard Sieve Sizes.*
U.S. Standard Sieve Sizes.*

* cited by examiner

*Primary Examiner*—Michael Barr
*Assistant Examiner*—Monique Wills
(74) *Attorney, Agent, or Firm*—Kubovcik & Kubovcik

(57) ABSTRACT

A separator for fuel cell, formed using a base material obtained from a composition comprising at least a binder, a powdery carbon filler having an average particle diameter of 10 nm to 100 μm, and a short fiber having an average fiber length of 0.03 to 6 mm, in which composition the amount ratio of the above three components is such that the amount of the powdery carbon filler is 200 to 800 parts by weight and the amount of the short fiber is 10 to 300 parts by weight, both per 100 parts by weight of the binder.

6 Claims, No Drawings

SEPARATOR FOR FUEL CELL, PROCESS FOR PRODUCTION THEREOF, AND SOLID POLYMER TYPE FUEL CELL USING SAID SEPARATOR

This application is a continuation of application Ser. No. 09/464,192, filed Dec. 16, 1999, now abandoned.

BACKGROUND OF THE INVENTION

1. Field of the Invention

The present invention relates to a separator for fuel cell, a process for production thereof, and a solid polymer type fuel cell using the separator. More particularly, the present invention relates to a separator for fuel cell having a strength necessary for separator even when made in a small thickness, a process for production thereof, and a solid polymer type fuel cell using the separator.

2. Description of the Prior Art

Fuel cells are advantageous in that they require substantially no fossil fuel (whose depletion in the near future is feared) and, when used for power generation, generate substantially no noise and are high in energy recovery as compared with other methods for power generation. Therefore, fuel cells are being developed as a power generation plant of relatively small size for buildings and factories.

Among fuel cells, a solid polymer type fuel cell operates at lower temperatures than other types of fuel cell do; therefore, it has such characteristics that not only the parts constituting the cell are little corroded, but also the cell can discharge a relatively large electric current for the low temperature operation. Therefore, the solid polymer type fuel cell is drawing attention as a substitute electric source for internal combustion engine of automobile.

Currently, a smaller size or thickness is required for various products and parts. In the solid polymer type fuel cell as well, a small volume and a compact shape are required when it is used as a substitute electric source for internal combustion engine of automobile.

Among the parts constituting the solid polymer type fuel cell, the separator is generally a flat plate having a plurality of parallel grooves formed at one or both sides, and is used for transferring the electricity generated inside the fuel cell, to outside.

Some of the conventional fuel cell separators are produced by impregnating a high-density graphite or a graphite material with a thermosetting resin and forming, at one or both sides of the resulting material, a plurality of parallel grooves by machining.

In JP-B-1-57466 is proposed a process for producing a separator by subjecting a mixture of a particular thermosetting resin and a graphite powder to pressure molding.

In JP-A-4-214072 is proposed a process for producing a fuel cell separator by molding a mixture of a phenolic resin, a milled carbon fiber and a graphite powder into a sheet shape and graphitizing the sheet material.

As a fuel cell of small volume and compact shape has come to be required as mentioned previously, the separator of fuel cell (which occupies a large portion of fuel cell) inevitably needs to be formable in a small size or in a small thickness and, when formed in a small thickness, needs to have a strength required for separator, that is, the separator needs to have a high strength and high toughness. However, the conventional separator obtained by subjecting graphite to machining and the separator obtained by subjecting, to pressure molding, a mixture of a particular thermosetting resin (specifically, a very special phenolic resin having a p-xylene bond in the molecular chain) and a graphite powder have had problems in that these separators, when made in a small thickness, are fragile, easily break at the time of fuel cell assembling, and have low reliability.

The fuel cell separator of small thickness obtained by subjecting a mixture of a resin, a fiber and a graphite powder to graphitization, has had problems in that (1) since the graphitization need be conducted by firing a sheet-shaped material at a high temperature of 1,500 to 3,000° C., the resulting separator is expensive owing to the use of a special equipment and method for such graphitization, (2) the sheet-shaped material contracts during the graphitization, resulting in low dimensional reproducibility, and (3) the strain caused by the above contraction remains in the graphitization product.

SUMMARY OF THE INVENTION

The present invention has been made with an aim of providing a separator for fuel cell which alleviates the problems of the prior art, has a strength necessary for separator even when made in a small thickness, generates no crack at the time of fuel cell assembling, and has high reliability; a process for producing the above separator for fuel cell, which requires no graphitization step; and a solid polymer type fuel cell of excellent durability using the above separator.

According to the present invention, there is provided a separator for fuel cell, formed using a base material obtained from a composition comprising at least a binder, a powdery carbon filler having an average particle diameter of 10 nm to 100 μm, and a short fiber having an average fiber length of 0.03 to 6 mm, in which composition the amount ratio of the above three components is such that the amount of the powdery carbon filler is 200 to 800 parts by weight and the amount of the short fiber is 10 to 300 parts by weight, both per 100 parts by weight of the binder.

The present invention further provides a process for producing a separator for fuel cell, which comprises mixing at least a binder, a powdery carbon filler having an average particle diameter of 10 nm to 100 μm, and a short fiber having an average fiber length of 0.03 to 6 mm in such an amount ratio that the amount of the powdery carbon filler becomes 200 to 800 parts by weight and the amount of the short fiber becomes 10 to 300 parts by weight, both per 100 parts by weight of the binder, granulating the resulting mixture into a granular material of 0.03 to 5 mm in particle diameter, and molding the granular material into a separator shape.

The present invention furthermore provides a solid polymer type fuel cell using the above separator.

DETAILED DESCRIPTION OF THE INVENTION

The present invention is described in detail below.

The binder used in the present invention has no particular restriction as long as it is a material which is so called. There can be mentioned, for example, a thermosetting resin, a thermoplastic resin and a rubber.

As the thermosetting resin, there can be mentioned, for example, phenolic resin, polycarbodiimide resin, furfuryl alcohol resin, epoxy resin, cellulose, urea resin, melamine resin, unsaturated polyester resin, silicone resin, diallyl phthalate resin, bismaleimidetriazine resin, polyaminobismaleimide resin and aromatic polyimide resin. They can be used singly or in admixture of two or more kinds.

As the thermoplastic resin, there can be mentioned, for example, polyethylene, polystyrene, polypropylene, polymethyl methacrylate, polyethylene terephthalate, polybutylene terephthalate, polyethersulfone, polycarbonate, polyoxamethylene, polyamide, polyimide, polyamideimide, polyvinyl alcohol, polyvinyl chloride, polyphenylsulfone, polyetherether ketone, polysulfone, polyether ketone, polyarylate, polyetherimide, polymethylpentene, fluororesin, polyoxybenzoyl ester resin, liquid crystal polyester resin, aromatic polyester, polyacetal, polyallylsulfone, polybenz-imidazole, polyethernitrile, polythioethersulfone and polyphenylene ether. They can be used singly or in admixture of two or more kinds.

As the rubber, there can be mentioned, for example, fluororubber, silicone rubber, butyl rubber, chloroprene rubber, nitrile rubber, nitrile-chloroprene rubber, chlorinated butyl rubber, epichlorohydrin rubber, epichlorohydrin-ethylene oxide rubber, epichlorohydrin-ethylene oxide-acrylic glycidyl ether terpolymer, urethane rubber, acrylic rubber, ethylene-propylene rubber, styrene rubber, butadiene rubber and natural rubber. They can be used singly or in admixture of two or more kinds.

The powdery carbon filler used in the present invention has no particular restriction except the particle diameter explained later, as long as it is a powdery carbon filler having excellent electroconductivity. There can be mentioned, for example, those made of natural graphite (e.g. scaly graphite or lumpy graphite), expanded graphite, artificial graphite, mesophase carbon, coal coke, petroleum coke, acetylene black, carbon black, Ketjen Black and glassy carbon.

The particle diameter of the powdery carbon filler can be 10 nm to 100 $\mu$m, preferably 20 to 80 $\mu$m in terms of average particle diameter. When the average particle diameter of the powdery carbon filler is smaller than 10 nm, bulk density of the powdery carbon filler is too low, which may allow the resulting separator to have a high electrical resistance or may make difficult the homogeneous mixing of the powdery carbon filler with the binder component (heterogeneous mixing may incur inferior molding). When the average particle diameter is larger than 100 $\mu$m, electrical contact is low between the particles of the powdery carbon filler or between the powdery carbon filler and the short fiber, which may make high the electrical resistance of the resulting separator.

The short fiber used in the present invention is preferably one made from a material high in strength and modulus of elasticity and excellent in corrosion resistance, electroconductivity, heat resistance and electrochemical corrosion resistance. There can be used, for example, at least one kind selected from a carbon fiber, a pyrolyzed carbon fiber (a flame-retarded fiber) and a stainless steel fiber.

The fiber length of the short fiber can be 0.03 to 6 mm, preferably 0.07 to 3.0 mm, more preferably 0.1 to 0.9 mm in terms of average fiber length. When the average fiber length of the short fiber is smaller than 0.03 mm, no strength improvement is obtained and, when a separator of small thickness is produced with this short fiber, the separator has no sufficient strength and may be unusable as a separator for fuel cell. When the average fiber length of the short fiber is larger than 6 mm, entanglement between fibers takes place in the mixing step of components, resulting in no sufficient dispersion of the short fiber; as a result, heterogeneity of strength arises and cracking may appear at the time of fuel cell assembling or during the operation of fuel cell.

As the carbon fiber, there can be mentioned a fiber obtained by subjecting a raw material (e.g. pitch-based fiber, polyacrylonitrile fiber, phenolic fiber, rayon fiber, cellulose-based fiber or aramid fiber) to a heat treatment of 450 to 3,000° C., preferably 800 to 2,200° C. in an inert gas atmosphere. As the pyrolyzed carbon fiber, there can be mentioned a fiber obtained by heating the same material as used for the carbon fiber, at a temperature of about 200 to 450° C.

To the mixture of the binder, the powdery carbon filler and the short fiber may be added a lubricant in order to improve the releasability from die during molding. There is no particular restriction as to the kind of the lubricant used, but there can be mentioned, for example, a fatty acid or a metal salt thereof (a metal soap), such as stearic acid, zinc stearate or the like; a fatty acid ester; a fatty acid chloride; an amine type fatty acid; an amide type fatty acid; a wax; and a polymer wax.

The amount ratio of components in the mixture of the binder, the powdery carbon filler and the short fiber can be such that the amount of the powdery carbon filler is 200 to 800 parts by weight and the amount of the short fiber is 10 to 300 parts by weight, both per 100 parts by weight of the binder.

When the amount of the powdery carbon filler is smaller than 200 parts by weight, the resulting separator has insufficient electroconductivity, particularly insufficient conductive paths between fibers and may have a high resistance. When the amount is larger than 800 parts by weight, the separator has an insufficient strength and, when made in a small thickness, generates cracks at the time of fuel cell assembling or during power generation and may be unusable as a separator for fuel cell.

When the amount of the short fiber is smaller than 10 parts by weight, the resulting separator has an insufficient strength and, when made in a small thickness, generates cracks at the time of fuel cell assembling or during power generation. When the amount is larger than 300 parts by weight, molding becomes inferior. In both cases, the separator obtained may be unusable as a separator for fuel cell.

The fuel cell separator of the present invention is produced according to the process of the present invention. First, the binder, the powdery carbon filler and the short fiber are mixed in the above-mentioned amount ratio; the resulting mixture is as necessary mixed with a solvent and subjected to granulation. This mixing and granulation step can be conducted by a known mixing method using, for example, a stirring rod, a kneader, a mixer, a static mixer, a Henschel mixer, a super mixer or a ribbon mixer. There is no particular restriction as to the mixing method.

As the solvent used as necessary in the mixing and granulation step, there can be mentioned, for example, water, methanol, ethanol, isopropyl alcohol, butanol, toluene, xylene, methyl ethyl ketone and acetone. However, the solvent is not restricted to these. The amount of the solvent used is 40% by weight or less, preferably 20% by weight or less based on the total solid content of the mixture obtained. Use of the solvent in an mount larger than 40% by weight is not desirable because it makes the granulation difficult and requires a longer drying time.

The granular mixture obtained above may as necessary be dried by a known drying means (e.g. fluidized bed dryer, hot air circulating dryer, vacuum dryer or fluidized bed vacuum dryer) to evaporate the solvent, etc. contained in the mixture.

The particle diameters of the granular mixture can be 0.03 to 5 mm, preferably 0.1 to 3.0 mm. When the particle diameters are smaller than 0.03 mm, it is difficult to allow the short fiber to be contained in the granular material, which may incur scatter in separator strength. When the particle diameters are larger than 5 mm, no uniform packing density is obtained when the granular mixture is placed in a die for molding and, when a separator of small thickness is produced, molding may become inferior.

In the present process, next, the granular mixture is made into a fuel cell separator shape. As the method usable for this operation, there can be mentioned, for example, injection molding, injection compression molding and compression molding. Compression molding is preferred.

In the above step, the molding temperature, the molding pressure and the molding time can be determined depending upon the binder, etc. used. However, there can be employed, for example, a temperature range from room temperature to the curing, melting or vulcanization of the resin, specifically as the molding temperature. The molded material may be subjected to a higher-temperature treatment to chemically stabilize the molded material.

For improved productivity, it is also possible to produce, in advance, a precursor by a method such as tableting, extrusion molding, pre-forming, belt press, roll press or the like, and then feed the precursor into a molding machine to obtain a fuel cell separator shape.

In the process for production of fuel cell separator according to the present invention, it is possible to form, during the molding of the granular mixture into a separator shape, grooves for oxidant gas feeding, grooves for fuel gas feeding, manifold, etc. all necessary for fuel cell separator, in the separator shape. This formation is made possible, for example, by (1) allowing at least either of the upper die and lower die (or core and cavity, or force die and support die, or male plate and female plate) of the die used in compression molding, to have surface unevennesses corresponding to the grooves for oxidant gas feeding, grooves for fuel gas feeding, manifold, etc. of fuel cell separator and (2) using the resulting die for molding of the granular mixture.

According to the present process, there can be easily obtained a fuel cell separator of small thickness, for example, a fuel cell separator having a thickness of 0.1 to 2.0 mm at the thinnest portion. Moreover, this separator has a deflection in bending of 0.5 mm or more, a bending strength of 4 to 15 $kgf/mm^2$, and a bending modulus of elasticity of 2,000 to 6,000 $kgf/mm^2$, and has a high strength and high toughness.

Using the above-mentioned fuel cell separator of the present invention which has a strength necessary for separator even when made in a small thickness, there can be obtained a solid polymer type fuel cell of the present invention (which is compact and highly durable as compared with conventional solid polymer type fuel cells) in the same manner as in conventional solid polymer type fuel cells, that is, by using the present fuel cell separators, a solid electrolyte membranes, gas diffusion electrodes and a sealing members and by clamping the bolts inserted therein, at a given pressure.

DESCRIPTION OF PREFERRED EMBODIMENTS

The present invention is described in more detail below by way of Examples.

EXAMPLES 1 TO 16

A binder, a carbon filler and a carbon fiber all shown in Table 1 or 2 were mixed in a mixer in the amount ratio shown in Table 1 or 2. Into the resulting mixture was dropped methanol in an amount of 15% by weight based on the total solid content of the mixture to produce a granular material having a particle size distribution of 0.1 to 3.0 mm. The granular material was dried in a dryer of 40° C. for 3 hours. The dried material was subjected to compression molding at a molding temperature of 150° C. at a molding pressure of 150 $kg/cm^2$ for 5 minutes to produce a separator for fuel cell having a thickness of 0.3 mm at the thinnest portion. The separator was measured for resistivity, gas permeability, bending strength, bending modulus of elasticity and deflection in bending. The results are shown in Table 1 or 2.

Incidentally, resistivity was measured by JIS H 0602; gas permeability was measured by the equal pressure method of JIS K 7126; bending strength and bending modulus of elasticity were measured by JIS K 6911; and deflection in bending was taken as the deformation appearing up to the rupture in the test for bending strength and bending modulus of elasticity.

Using each of the separators produced in Examples 1 to 16, together with a solid polymer electrolyte membrane, gas diffusion electrodes and sealing members, a solid polymer type fuel cell was assembled and operated for 1,000 hours. The cell voltage after 1,000-hour operation was measured as a value when the initial cell voltage was taken as 100. After the 1,000-hour operation, the cell was disintegrated to observe the separator condition. The results are shown in Tables 1 and 2.

TABLE 1

|  | Example | | | | | |
| --- | --- | --- | --- | --- | --- | --- |
|  | 1 | 2 | 3 | 4 | 5 | 6 |
| Binder | | | | | | |
| Novolac type phenolic resin | 100 | 100 | 100 | | | |
| Resole type phenolic resin | | | | 100 | 100 | 100 |
| Carbon filler | | | | | | |
| Scaly graphite (average particle diameter = 30 m) | 290 | 290 | 290 | 290 | 290 | 290 |
| Carbon fiber | | | | | | |
| Average fiber length = 0.4 mm | 68 | | | 68 | | |
| Average fiber length = 0.7 mm | | 68 | | | 68 | |
| Average fiber length = 0.9 mm | | | 68 | | | 68 |
| Lubricant | | | | | | |
| Zinc stearate | 4.55 | 4.55 | 4.55 | 4.55 | 4.55 | 4.55 |
| Resistivity (mcm) | 25 | 25 | 25 | 19 | 19 | 25 |
| Gas permeability ($ml/m^2 dayatm$) | 3 | 3 | 3 | 3 | 3 | 3 |
| Deflection in bending (mm) | 0.7 | 1.0 | 0.7 | 0.7 | 1.0 | 0.7 |
| Bending strength ($kgf/mm^2$) | 0.7 | 10.0 | 7.0 | 6.0 | 7.0 | 5.0 |
| Bending modulus ($kgf/mm^2$) | 3900 | 3600 | 3600 | 3900 | 3400 | 3400 |
| Cell voltage after 1,000 hours (initial cell voltage is taken as 100) | 99 | 99 | 99 | 99 | 99 | 99 |
| Separator condition after 1,000-hour operation | No problem | No problem | No problem | No problem | No problem | No problem |

TABLE 2

| | Example | | | | | | | | | |
|---|---|---|---|---|---|---|---|---|---|---|
| | 7 | 8 | 9 | 10 | 11 | 12 | 13 | 14 | 15 | 16 |
| Binder | | | | | | | | | | |
| Novolac type phenolic resin | 100 | 100 | 100 | | | | | 100 | 100 | 100 |
| Epoxy resin | | | | 100 | | | | | | |
| Dially phthalete resin | | | | | 100 | | | | | |
| Polypherrylsulphone | | | | | | 100 | | | | |
| Silicone rubber | | | | | | | 100 | | | |
| Carbon filler | | | | | | | | | | |
| Scaly graphite (average particle diameter = 30 m) | 200 | 800 | 290 | 290 | 290 | 290 | 290 | | | |
| Scaly graphite (average particle diameter = 80 m) | | | | | | | | 290 | | |
| Scaly graphite (average particle diameter = 20 m) | | | | | | | | | 290 | |
| Acetylene black (average particle diameter = 40 nm) | | | | | | | | | | 290 |
| Carbon fiber | | | | | | | | | | |
| Average fiber length = 0.7 mm | 68 | 68 | 10 | 300 | 68 | 68 | 68 | 68 | 68 | 68 |
| Lubricant | | | | | | | | | | |
| Zinc stearate | 4.55 | 4.55 | 4.55 | 4.55 | 4.55 | 4.55 | 4.55 | 4.55 | 4.55 | 4.55 |
| Resistivity (mcm) | 45 | 8 | 23 | 30 | 24 | 26 | 28 | 28 | 23 | 30 |
| Gas permeability (ml/m$^2$dayatm) | 3 | 45 | 30 | 25 | 3 | 6 | 10 | 20 | 3 | 45 |
| Deflection in bending (mm) | 0.7 | 0.5 | 0.5 | 0.7 | 0.7 | 0.6 | 0.9 | 0.5 | 0.6 | 0.5 |
| Bending strength (kgf/mm$^2$) | 5.0 | 4.2 | 4.0 | 6.0 | 6.8 | 5.5 | 6.0 | 4.5 | 6.0 | 4.3 |
| Bending modulus (kgf/mm$^2$) | 4500 | 4000 | 4000 | 3500 | 3600 | 4500 | 3500 | 4500 | 4500 | 3900 |
| Cell voltage after 1,000 hours (initial cell voltage is taken as 100) | 97 | 95 | 95 | 95 | 99 | 98 | 98 | 98 | 97 | 95 |
| Separator condition after 1,000-hour operation | No problem | No problem | No problem | No problem | No problem | No problem | No problem | No problem | No problem | problem |

EXAMPLES 17 TO 19

A separator for fuel cell was produced in the same manner as in Example 2 except that the granular mixture used had a particular size distribution shown in Table 3. The separator was measured for resistivity, gas permeability, bending strength, bending modulus of elasticity and deflection in bending in the same manner as in Examples 1 to 16. The results are shown in Table 4. A polymer type fuel cell was assembled in the same manner as in Examples 1 to 16, and measured for cell voltage and separator condition in the same manner as in Examples 1 to 16. The results are shown in Table 4.

TABLE 3

| Particle size distribution | 0.03–0.1 mm | 0.1–3.0 mm | 3.0–5.0 mm |
|---|---|---|---|
| Example 17 | 80% | 20% | 0% |
| Example 18 | 25% | 50% | 25% |
| Example 19 | 0% | 20% | 80% |

EXAMPLE 20

A separator for fuel cell was produced in the same manner as in Example 2 except that injection molding was used. The separator was measured for resistivity, gas permeability, bending strength, bending modulus of elasticity and deflection in bending in the same manner as in Examples 1 to 16. The results are shown in Table 4. A polymer type fuel cell was assembled in the same manner as in Examples 1 to 16, and measured for cell voltage and separator condition in the same manner as in Examples 1 to 16. The results are shown in Table 4.

EXAMPLE 21

A separator for fuel cell was produced in the same manner as in Example 2 except that the compression injection molding was used. The separator was measured for resistivity, gas permeability, bending strength, bending modulus of elasticity and deflection in bending in the same manner as in Examples 1 to 16. The results are shown in Table 4. A polymer type fuel cell was assembled in the same manner as in Examples 1 to 16, and measured for cell voltage and separator condition in the same manner as in Examples 1 to 16. The results are shown in Table 4.

TABLE 4

| | Example | | | | |
|---|---|---|---|---|---|
| | 17 | 18 | 19 | 20 | 21 |
| Binder | | | | | |
| Novolac type phenolic resin | 100 | 100 | 100 | 100 | 100 |
| Carbon filler | | | | | |
| Scaly graphite (average particle diameter = 30 m) | 290 | 290 | 290 | 290 | 290 |
| Carbon fiber | | | | | |
| Average fiber length = 0.7 mm | 68 | 68 | 68 | 68 | 68 |
| Lubricant | | | | | |
| Zinc stearate | 4.55 | 4.55 | 4.55 | 4.55 | 4.55 |
| Resistivity (mcm) | 60 | 58 | 60 | 120 | 100 |
| Gas permeability (ml/m$^2$dayatm) | 80 | 75 | 80 | 110 | 100 |
| Deflection in bending (mm) | 0.5 | 0.5 | 0.5 | 0.5 | 0.5 |
| Bending strength (kgf/mm$^2$) | 4.2 | 4.4 | 4.2 | 4.0 | 4.0 |
| Bending modulus (kgf/mm$^2$) | 5500 | 5000 | 5500 | 5000 | 5000 |

TABLE 4-continued

|  | Example | | | | |
|---|---|---|---|---|---|
|  | 17 | 18 | 19 | 20 | 21 |
| Cell voltage after 1,000 hours (initial cell voltage is taken as 100) | 95 | 95 | 95 | 93 | 93 |
| Separator condition after 1,000-hour operation | No problem | No problem | No problem | No problem | No problem |

Comparative Example 1

A separator for fuel cell was produced in the same manner as in Example 1 except that no carbon fiber was used and the amount of carbon filler was increased to 358 parts by weight. The separator was measured for resistivity, gas permeability, bending strength, bending modulus of elasticity and deflection in bending in the same manner as in Example 1. The results are shown in Table 5. A polymer type fuel cell was assembled in the same manner as in Example 1, and measured for cell voltage and separator condition in the same manner as in Example 1. The results are shown in Table 5.

Comparative Example 2

A separator for fuel cell was produced the same manner as in Example 2 except that no carbon filler was used and the amount of carbon fiber was increased to 358 parts by weight. The separator was measured for resistivity, gas permeability, bending strength, bending modulus of elasticity and deflection in bending in the same manner as in Example 1. The results are shown in Table 5. A polymer type fuel cell was assembled in the same manner as in Example 1, and measured for cell voltage and separator condition in the same manner as in Example 1. The results are shown in Table 5.

Comparative Examples 3 to 8

A binder, a carbon filler and a carbon fiber all shown in Table 5 were mixed in a mixer in the amount ratio shown in Table 5. Into the resulting mixture was dropped methanol in an amount of 15% by weight based on the total solid content of the mixture to produce a granular material. The granular material was dried in a dryer of 40° C. for 3 hours. The dried material was subjected to compression molding at a molding temperature of 150° C. at a molding pressure of 150 kg/cm$^2$ for 5 minutes to produce a separator for fuel cell having a thickness of 0.3 mm at the thinnest portion. The separator was measured for resistivity, gas permeability, bending strength, bending modulus of elasticity and deflection in ending, in the same manner as in the Examples. The results are shown in Table 5. Using each of the separators produced above, together with a solid polymer electrolyte membrane, gas diffusion electrodes and sealing members, a solid polymer type fuel cell was assembled and operated for 1,000 hours. The cell voltage after 1,000-hour operation was measured as a value when the initial cell voltage was taken as 100. After the 1,000-hour operation, the cell was disintegrated to observe the separator condition. The results a shown in Table 5.

TABLE 5

|  | Comparative Example | | | | | | | |
|---|---|---|---|---|---|---|---|---|
|  | 1 | 2 | 3 | 4 | 5 | 6 | 7 | 8 |
| Binder | | | | | | | | |
| Novolac type phenolic resin | 100 | 100 | 100 | 100 | 100 | 100 | 100 | 100 |
| Carbon filler | | | | | | | | |
| Scaly graphite (average particle diameter = 30 m) | 358 | | 100 | 1000 | 290 | 290 | 290 | 290 |
| Carbon fiber | | | | | | | | |
| Average fiber length = 0.07 mm | | 358 | 68 | 668 | 5 | 600 | | |
| Average fiber length = 0.01 mm | | | | | | | 68 | |
| Average fiber length = 12 mm | | | | | | | | 68 |
| Lubricant | | | | | | | | |
| Zinc stearate | 4.55 | 4.55 | 4.55 | 4.55 | 4.55 | 4.55 | 4.55 | 4.55 |
| Resistivity (mcm) | 20 | 80 | 1000 | 400 | 26 | 500 | 28 | 23 |
| Gas permeability (ml/m$^2$dayatm) | 100000 | 100000 | 5000 | 10000 | 20000 | 100000 | 10000 | 100000 |
| Deflection in bending (mm) | 0.2 | 0.3 | 0.2 | 0.2 | 0.2 | 0.2 | 0.2 | 0.2 |
| Bending strength (kgf/mm$^2$) | 2.1 | 1.5 | 3.0 | 2.0 | 2.0 | 2.0 | 1.9 | 2.0 |
| Bending modulus (kgf/mm$^2$) | 5500 | 4500 | 3500 | 3600 | 4500 | 3500 | 4500 | 4500 |
| Cell voltage after 1,000 hours (initial cell voltage is taken as 100) | Note(2) | Note(2) | Note(1) | 25 | Note(2) | Note(2) | Note(2) | Note(2) |
| Separator condition after 1,000-hour operation | Cracked | Cracked | No problem | Crazed | Cracked | Cracked | Cracked | Cracked |

Note(1): Voltage effect was too large owing to high resistance, and power generation was impossible.
Note(2): Gas leakage was too striking, and power generation was impossible.

As is clear from the above Examples and Comparative Examples, the separator for fuel cell according to the present invention has a strength necessary for separator even when made in a small thickness, generates no crack at the time of fuel cell assembling or during the power generation of assembled fuel cell, and has high reliability.

The process for production of fuel cell separator according to the present invention can produce an excellent fuel cell separator such as mentioned above, without requiring any graphitization or machining step.

The solid polymer type fuel cell of the present invention using the above separator has very high durability.

What is claimed is:

1. A separator for a fuel cell, comprising a base material comprising at least a binder, a powdery carbon filler having an average particle diameter of 10 nm to 100 µm, and a short fiber having an average fiber length of 0.4 to 0.9 mm, in which composition the amount ratio of the above three components is such that the amount of the powdery carbon filler is 200 to 800 parts by weight and the amount of the short fiber is 10 to 300 parts by weight, both per 100 parts by weight of the binder.

2. A separator according to claim 1, wherein the short fiber is at least one fiber selected from a carbon fiber, a pyrolyzed carbon fiber and a stainless steel fiber.

3. A process for producing a separator for a fuel cell, which comprises mixing at least a binder, a powdery carbon filler having an average particle diameter of 10 nm to 100 μm, and a short fiber having an average fiber length of 0.4 to 0.9 mm in such an amount ratio that the amount of the powdery carbon filler becomes 200 to 800 parts by weight and the amount of the short fiber becomes 10 to 300 parts by weight, both per 100 parts by weight of the binder, granulating the resulting mixture into a granular material of 0.03 to 5 mm in particle diameter, and molding the granular material into a separator shape.

4. A process according to claim 3, wherein the granulation of the mixture is conducted using a solvent.

5. A solid polymer fuel cell comprising a separator set forth in claim 1.

6. A solid polymer fuel cell comprising a separator set forth in claim 2.

* * * * *